US008661327B1

(12) United States Patent
Channakeshava

(10) Patent No.: US 8,661,327 B1
(45) Date of Patent: Feb. 25, 2014

(54) METHOD AND SYSTEM FOR AUTOMATED INSERTION OF RELEVANT HYPERLINKS INTO SOCIAL MEDIA-BASED COMMUNICATIONS

(75) Inventor: Girish Mallenahally Channakeshava, Bangalore (IN)

(73) Assignee: Intuit Inc., Mountain View, CA (US)

( * ) Notice: Subject to any disclaimer, the term of this patent is extended or adjusted under 35 U.S.C. 154(b) by 151 days.

(21) Appl. No.: 12/985,641

(22) Filed: Jan. 6, 2011

(51) Int. Cl.
*G06F 17/00* (2006.01)

(52) U.S. Cl.
USPC .......................................... 715/205; 715/200

(58) Field of Classification Search
USPC .......................................... 715/200, 205, 255
See application file for complete search history.

(56) References Cited

U.S. PATENT DOCUMENTS

| | | | | |
|---|---|---|---|---|
| 7,593,962 | B2 * | 9/2009 | Beale et al. ............................. | 1/1 |
| 7,827,165 | B2 * | 11/2010 | Abernethy et al. ........... | 707/708 |
| 7,830,396 | B2 * | 11/2010 | Lindberg et al. .............. | 345/581 |
| 7,954,058 | B2 * | 5/2011 | Kalaboukis et al. .......... | 715/753 |
| 8,190,681 | B2 * | 5/2012 | Markus et al. ................ | 709/204 |
| 8,255,786 | B1 * | 8/2012 | Gattani et al. ................ | 715/205 |
| 8,346,217 | B2 * | 1/2013 | Crawford et al. ............. | 455/411 |
| 2006/0190424 | A1 * | 8/2006 | Beale et al. ......................... | 707/2 |
| 2008/0082905 | A1 * | 4/2008 | Martinez et al. .............. | 715/205 |
| 2008/0098289 | A1 * | 4/2008 | Williams et al. .............. | 715/200 |
| 2008/0104495 | A1 * | 5/2008 | Craig ............................ | 715/205 |
| 2008/0228947 | A1 * | 9/2008 | Markus et al. ................ | 709/249 |
| 2008/0229244 | A1 * | 9/2008 | Markus et al. ................ | 715/811 |
| 2009/0216639 | A1 * | 8/2009 | Kapczynski et al. ........... | 705/14 |
| 2009/0222315 | A1 * | 9/2009 | Hayes, Jr. ..................... | 705/10 |
| 2010/0131335 | A1 * | 5/2010 | Roh et al. ..................... | 705/10 |
| 2010/0228617 | A1 * | 9/2010 | Ransom et al. ............. | 705/14.25 |
| 2010/0281353 | A1 * | 11/2010 | Rubin ............................ | 715/208 |
| 2011/0041168 | A1 * | 2/2011 | Murray et al. ..................... | 726/7 |
| 2011/0055017 | A1 * | 3/2011 | Solomon et al. ........... | 705/14.66 |
| 2011/0163859 | A1 * | 7/2011 | Chraime et al. .......... | 340/309.16 |
| 2011/0209196 | A1 * | 8/2011 | Kennedy .......................... | 726/1 |
| 2011/0225481 | A1 * | 9/2011 | Zuckerberg et al. .......... | 715/205 |
| 2011/0238763 | A1 * | 9/2011 | Shin et al. ..................... | 709/206 |

(Continued)

OTHER PUBLICATIONS

Rowe et al., Anticipating Discussion Activity on Community Forums, IEEE 2011, pp. 315-322.*

(Continued)

*Primary Examiner* — Cong-Lac Huynh
(74) *Attorney, Agent, or Firm* — Hawley Troxell Ennis & Hawley LLP; Philip McKay; Sean P. Lewis

(57) ABSTRACT

A method and system for automated insertion of relevant hyperlinks into social media-based communications whereby a business owner defines one or more trigger terms associated with the business. For each defined trigger term, one or more hyperlinks to one or more webpages associated with the business are assigned to the trigger term. Social media communications associated with one or more social media systems are then monitored, and/or scanned, for the defined one or more trigger terms and, if a trigger term is detected in the text of a social media communication, the hyperlink assigned to the detected trigger term is inserted in the text of social media communication and/or a response to the social media communication. The modified social media communication and/or response to the social media communication, including the modified text, is then sent, and/or posted, through, and/or on, the social media system.

16 Claims, 2 Drawing Sheets

(56) References Cited

U.S. PATENT DOCUMENTS

| | | | |
|---|---|---|---|
| 2011/0276396 A1* | 11/2011 | Rathod | 705/14.49 |
| 2011/0295823 A1* | 12/2011 | Sathish | 707/705 |
| 2012/0023390 A1* | 1/2012 | Howes et al. | 715/205 |
| 2012/0066073 A1* | 3/2012 | Dilip et al. | 705/14.66 |
| 2012/0117049 A1* | 5/2012 | Zhou | 707/706 |
| 2012/0143839 A1* | 6/2012 | Zhou | 707/706 |
| 2012/0197871 A1* | 8/2012 | Mandel et al. | 707/722 |
| 2012/0209929 A1* | 8/2012 | Bercu et al. | 709/206 |
| 2012/0239479 A1* | 9/2012 | Amaro et al. | 705/14.23 |
| 2012/0284174 A1* | 11/2012 | Bentley et al. | 705/39 |
| 2013/0036344 A1* | 2/2013 | Ahmed et al. | 715/205 |
| 2013/0086187 A1* | 4/2013 | Cohen et al. | 709/206 |

OTHER PUBLICATIONS

Beck, Analyzing Tweets to Identify Malicious Messages, IEEE 2011, pp. 1-5.*

Lappas et al., A Survey of Algorithms and Systems for Expert Location in Social Networks, Google 2011, pp. 215-241.*

Gao et al., Detecting and Characterizing Social Spam Campaigns, ACM 2010, pp. 35-47.* van Liere, How Far Does a Tweet Traval? Information Brokers in Twitterver, ACM 2010, pp. 1-4.*

Johnson et al., Identification of Related Information of Interest across Free Text Documents, IEEE 2011, pp. 101-106.*

Rahman et al., Building Dynamic Social Network from Sensory Data Feed, IEEE 2010, pp. 1327-1341.*

* cited by examiner

METHOD AND SYSTEM FOR AUTOMATED INSERTION OF RELEVANT HYPERLINKS INTO SOCIAL MEDIA-BASED COMMUNICATIONS

BACKGROUND

Advertising and marketing often represents a significant on-going expense for businesses, i.e., sellers and/or providers of consumer goods, products, and/or services. Consequently, both business owners/managers and providers of marketing and advertising tools are constantly looking for new ways to provide advertising to potential customers, i.e., consumers.

Theoretically, social media systems, such as Twitter™, Facebook™, MySpace™, Linkedin™, etc., offer businesses a mechanism for relaying information about their businesses and/or providing marketing data and offers. However, currently, many business owners and/or managers are unable to take advantage of these social media systems for one or more of several reasons.

As one example, many social media communications, such as postings, and/or messages, made to, and/or through, currently available social media systems are "business relevant social media communications" that make reference to, relay information about, and/or ask questions about, various businesses, product brands/lines, service brands/lines, specific products, specific services, specific service features, and/or specific product features.

As one specific illustrative example of a business relevant social media communication, a Tweet™ may read, in part: "Where is it better to buy baby clothes?"

As another specific illustrative example of a business relevant social media communication, another tweet, may read in part: "Where is the cheapest place to buy Nike Infant Shoes?"

As another specific illustrative example of a business relevant social media communication, a Facebook message may read, in part: "Hey! Just wanted to ask if you know where to buy a Monte Carlo men's Jacket in Bangalore?"

As another specific illustrative example of a business relevant social media communication, a Facebook message may read, in part: "Friends . . . I have to go buy Jewelry for elder sister . . . where can I best buy?"

As another specific illustrative example of a business relevant social media communication, a Facebook message may read, in part: Any thoughts why should I upgrade to Quick-Books™ 2011?

As noted above, business relevant social media communications, such as those seen in the illustrative examples above, that make reference to, relay information about, and/or ask questions about, businesses, products, and/or services, are quite common. As can also be readily realized from the illustrative examples above, many business owners and/or product and/or service providers, would benefit by being able to inject information about their products and/or services into this communication stream, and/or these business relevant social media communications. However, currently, business relevant social media communications are typically sent to either a specific one or more users associated with the social media system, or they are posted, or "broadcast", to a community of users associated with the social media system. Consequently, currently, business owners and/or product and/or service providers are largely denied access to this communication stream, and these business relevant social media communications are often sent/posted to, and/or responded to by, parties not connected to, informed of, or associated with, the businesses, products, and/or services, referenced in the business relevant social media communications. As a result, currently, many business relevant social media communications go unanswered, and/or are not answered completely, and/or are answered with incorrect information, by parties who do not have the data/information to provide accurate, or complete information regarding the businesses, products, and/or services referenced in the message posting.

In addition, many currently available social media systems impose strict limitations on the size, and/or number of characters, that can be included in a given message, and/or posting. Consequently, in some cases, even when a business relevant social media communication is received/viewed by a party competent to provide the desired information associated with the businesses, products, and/or services, the message/posting size restrictions prevent the competent party from posting a response that actually provides accurate, or complete, information regarding the businesses, products, and/or services referenced in the business relevant social media communication.

As a result of the situation described above, not only are business owners, and/or providers of products and/or services, denied the opportunity to inject accurate information about their products and/or services into business relevant social media communications, but users of the social media systems are also denied the accurate information about products and/or services that they desire.

SUMMARY

In accordance with one embodiment, a method and system for automated insertion of relevant hyperlinks into social media-based communications includes a process for automated insertion of relevant hyperlinks into social media-based communications whereby, in one embodiment, a business owner, and/or a provider of products and/or services, or any other party, defines one or more trigger terms associated with the business, and/or one or more products associated with the business, and/or one or more services associated with the business. In one embodiment, for each defined trigger term, one or more hyperlinks to one or more webpages associated with the business, and/or one or more products associated with the business, and/or one or more services associated with the business, is assigned to the trigger term. In one embodiment, social media communications associated with one or more social media systems are monitored, and/or scanned, for the defined one or more trigger terms. In one embodiment, if a trigger term is detected in the text of a social media communication, the status of the social media communication, and/or any response to the social media communication, is transformed to the status of "business relevant social media communication" and the hyperlink assigned to the detected trigger term is inserted in the text of social media communication, and/or a response to the social media communication, thereby transforming the social media communication, and/or a response to the social media communication, text into "modified business relevant social media communication text" that includes the relevant hyperlink to one or more webpages associated with the business, and/or one or more products associated with the business, and/or one or more services associated with the business assigned to the detected trigger term. In one embodiment, the business relevant social media communication, including the modified business relevant social media communication text, is then sent, and/or posted, through, and/or on, the social media system.

Using the method and system for automated insertion of relevant hyperlinks into social media-based communications, as discussed herein, business relevant social media communications are identified and are transformed to include hyperlinks to the data/information required to provide accurate, or complete information regarding the businesses, products, and/or services referenced in the message posting. Consequently, using the method and system for automated insertion of relevant hyperlinks into social media-based communications, as discussed herein, business owners, and/or providers of products and/or services, are provided the opportunity to inject accurate information about their products and/or services into business relevant social media communications and users of the social media systems are provided the accurate information about products and/or services that they desire.

In addition, since the method and system for automated insertion of relevant hyperlinks into social media-based communications, as discussed herein, uses hyperlinks to provide the accurate, or complete information regarding the businesses, products, and/or services referenced in the message posting, the information can usually be made available without violating any message/posting size, and/or number of character, restrictions imposed by the social media system. Consequently, using the method and system for automated insertion of relevant hyperlinks into social media-based communications, as discussed herein, both businesses and social media system users are benefitted.

Figure 1:
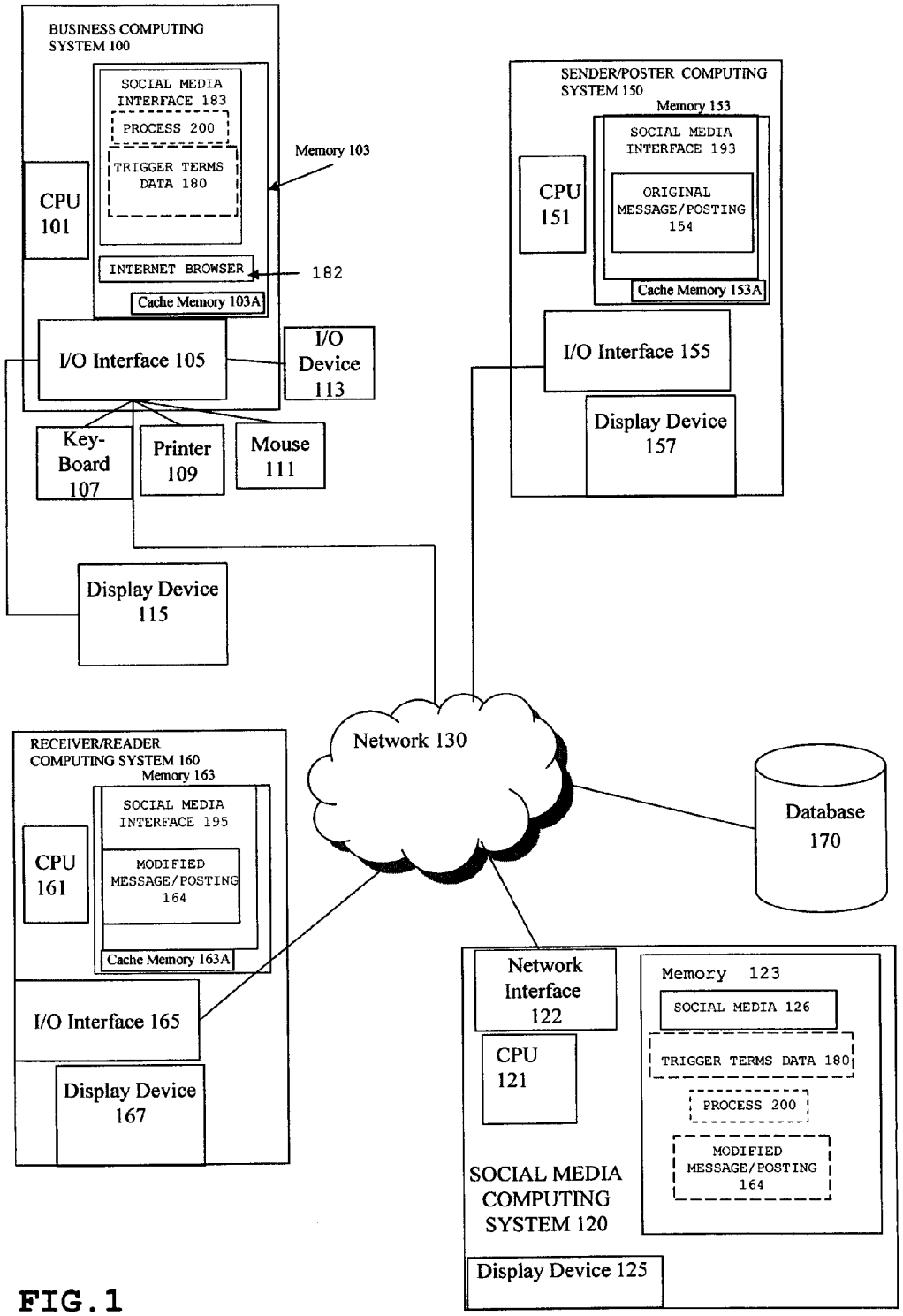
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms other than those shown and discussed herein and should not be construed as limited to the embodiments set forth herein, shown in the FIG.s, and/or described below.

In accordance with one embodiment, a method and system for automated insertion of relevant hyperlinks into social media-based communications includes a process for automated insertion of relevant hyperlinks into social media-based communications whereby, in one embodiment, a business owner, and/or a provider of products and/or services, or any other party, defines one or more trigger terms associated with the business, and/or one or more products associated with the business, and/or one or more services associated with the business.

In various embodiments, the trigger terms include, but are not limited to, any one or more of the following: any term, phrase, symbol, abbreviation, or slang, in one or more languages, associated, directly or indirectly, with the business, provider of products, provider of services, or associate or agent thereof; any term, phrase, symbol, abbreviation, or slang, in one or more languages, associated, directly or indirectly, with any products, product brand names, product brand lines, product features, and/or product stores associated with the business, provider of products, provider of services, or associate or agent thereof; any term, phrase, symbol, abbreviation, or slang, in one or more languages, associated, directly or indirectly, with any services, service brand names, service brand lines, service features, and/or service stores associated with the business, provider of products, provider of services, or associate or agent thereof; and/or any term, phrase, symbol, abbreviation, or slang, in one or more languages, whether protected by intellectual property rights or not, desired by the business, provider of products, provider of services, or associate or agent thereof, as discussed herein, and/or as known in the art at the time of filing, and/or as developed after the time of filing.

In one embodiment, data representing the defined trigger terms is stored.

In one embodiment, for each defined trigger term, one or more hyperlinks to one or more webpages associated with the business, and/or one or more products associated with the business, and/or one or more services associated with the business, is assigned to the trigger term.

In various embodiments, the hyperlinks are associated with webpages on a network, such as the Internet. In various embodiments, the hyperlinks are associated with webpages provided by one or more processors associated with one or more computing systems. In various embodiments, the hyperlinks are associated with webpages provided by a database.

In various embodiments, the webpages accessed via the hyperlinks provide, but are not limited to, one or more of the following: information associated with the business, and/or one more providers of the product and/or service; contact information for the business, and/or one more providers of the product and/or service; locations of the business, and/or one more providers of the product and/or service; maps associated with the business, and/or one more providers of the product and/or service; information regarding any products, product brand names, product brand lines, product features, and/or product stores, associated with the business, provider of products, provider of services, or associate or agent thereof; information regarding any services, service brand names, service brand lines, service features, and/or service stores, associated with the business, provider of products, provider of services, or associate or agent thereof; and/or any other information desired by the business, provider of products, provider of services, or associate or agent thereof, as discussed herein, and/or as known in the art at the time of filing, and/or as developed after the time of filing.

In various embodiments, the hyperlinks and/or webpages are selected to be assigned to a given trigger term based on secondary analysis such as, but not limited to: the location of the sender and/or receiver of the social media communication, as determined in one embodiment, by the IP address associated with the sender and/or receiver of the social media communication; the language used in the social media communication; the specific social media system used; the specific type of social media communication; any other text of the social media communication; and/or any other secondary analysis desired by the business, provider of products, provider of services, or associate or agent thereof, as discussed herein, and/or as known in the art at the time of filing, and/or as developed after the time of filing.

In one embodiment, data indicating the defined trigger terms, the hyperlinks assigned to the trigger terms, and the association of the defined trigger terms and the hyperlinks assigned to the trigger terms, is stored.

In one embodiment, social media communications, such as, but not limited to: messages, and/or response to messages, and/or treads of messages; SMS text, tweets, and/or responses to tweets, and/or threads of tweets; or postings, and/or responses to postings, and/or treads of postings, associated with one or more social media systems are monitored, and/or scanned, for the defined one or more trigger terms using one or more processors associated with one or more computing systems In one embodiment, social media communications associated with one or more social media systems are monitored, and/or scanned, for the defined one or more trigger terms in cooperation with the one or more social media systems and/or one or more users of the one or more social media systems.

Methods, means, mechanisms, processes, and procedures for trapping, buffering, scanning, and monitoring communications, messages, and postings, are well known in the art and will vary from social media system-to-social media system. Therefore, a more detailed discussion of specific methods, means, mechanisms, processes, and procedures for trapping, monitoring, and/or scanning, social media communications associated with one or more social media systems for defined one or more trigger terms is omitted here to avoid detracting from the invention.

In one embodiment, if a trigger term is detected in the text of a social media communication, the status of the social media communication is transformed to the status of "business relevant social media communication" by one or more processors associated with one or more computing systems.

Herein the term "social media communication" includes an original, or initial, message and/or posting made via a social media system and/or any response to, or thread related to, the original, or initial, message and/or posting made via a social media system.

Herein the term "business relevant social media communication" includes an original, or initial, message and/or posting made via a social media system that is identified as being relevant to a business and/or product and/or service, and/or any response to, or thread related to, the original, or initial, message and/or posting identified as being relevant to a business and/or product and/or service made via a social media system.

In one embodiment, if a trigger term is detected in the text of a social media communication, the hyperlink assigned to the detected trigger term is inserted in the text of social media communication by one or more processors associated with one or more computing systems, thereby transforming the social media communication text into "modified business relevant social media communication text" that includes the relevant hyperlink to one or more webpages associated with the business, and/or one or more products associated with the business, and/or one or more services associated with the business, assigned to the detected trigger term.

In one embodiment, the business relevant social media communication, including the modified business relevant social media communication text, is then sent, and/or posted, through, and/or on, the social media system.

In various embodiments, with minor modifications, the method and system for automated insertion of relevant hyperlinks into social media-based communications, as discussed herein, can be applied to other information systems such as, but not limited to, search engine results, e-mail systems, more general SMS messaging systems, and/or any information systems as discussed herein, and/or as known in the art at the time of filing, and/or as developed after the time of filing.

Using the process for automated insertion of relevant hyperlinks into social media-based communications, as discussed herein, business relevant social media communications are identified and are transformed to include hyperlinks to the data/information required to provide accurate, or complete information regarding the businesses, products, and/or services referenced in the business relevant social media communication posting. Consequently, using the process for automated insertion of relevant hyperlinks into social media-based communications, as discussed herein, business owners, and/or providers of products and/or services, are provided the opportunity to inject accurate information about their products and/or services into business relevant social media communications and users of the social media systems are provided the accurate information about products and/or services that they desire.

In addition, since the process for automated insertion of relevant hyperlinks into social media-based communications, as discussed herein, uses hyperlinks to provide the accurate, or complete information regarding the businesses, products, and/or services referenced in the message posting, the information can usually be made available without violating any message/posting size, and/or number of character, restrictions imposed by the social media system. Consequently, using the process for automated insertion of relevant hyperlinks into social media-based communications, as discussed herein, both businesses and social media system users are benefitted.

Hardware Architecture

FIG. 1 is a block diagram of an exemplary hardware architecture for implementing one embodiment of a system and method for automated insertion of relevant hyperlinks into social media-based communications, such as exemplary process 200 discussed herein, that includes: a business computing system 100, e.g., a first computing system; a sender/poster computing system 150, e.g., a second computing system; a social media computing system 120, e.g., a third computing system; a receiver/reader computing system 160, e.g., a fourth computing system; and a database 170, all operatively coupled by a network 130.

As seen in FIG. 1, business computing system 100 typically includes a central processing unit (CPU) 101, an input/output (I/O) interface 105, and a memory system 103, including cache memory 103A.

In one embodiment, memory system 103 includes all, or part of, a social media interface 183 for interacting with social media system 120 and social media 126, via one or more user interface display screens displayed on display device 113 and/or user input through a user interface device such as a keyboard 107, mouse 111, touchpad, voice command recognition system, or any other device capable of providing user input to a computing system or for translating user actions into computing system operations, whether available or known at the time of filing or as developed later.

Examples of social media system 120 and/or social media 126 include, but are not limed to, Facebook™, MySpace™, LinkedIn™, and Twitter™.

In one embodiment, memory system 103 includes all, or part of, a system and method for automated insertion of relevant hyperlinks into social media-based communications, such as exemplary process 200 discussed herein.

In one embodiment, memory system 103 includes all, or part of, trigger terms data 180 representing any one or more trigger terms as discussed herein, and/or as known in the art at the time of filing, and/or as developed after the time of filing.

Business computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, business computing system 100, whether available or known at the time of filing or as later developed. As discussed in more detail below, in one embodiment, process for automated insertion of relevant hyperlinks into social media-based communications 200 is entered, in whole, or in part, into business computing system 100 via I/O device 113, such as from a CD, DVD, floppy disk, portable hard drive, memory stick, download site, or other medium and/or computer program product as defined herein.

In one embodiment, business computing system 100 also includes an Internet browser capability 182 that, in one embodiment, is stored, in whole or in part, in memory 103.

In one embodiment, business computing system 100 is a computing system accessible by a social media system provider and/or a provider of process for automated insertion of relevant hyperlinks into social media-based communications 200 and is used and/or accessible by another computing system, such as sender/poster computing system 150 (discussed below), social media computing system 120, receiver/reader computing system 160, a workstation, a two-way pager, a cellular telephone, a smart phone, a digital wireless telephone, a Personal Digital Assistant (PDA), a server computer, an Internet appliance, any other device, or any desired combination of these devices, that includes components that can execute all, or part, of a process for automated insertion of relevant hyperlinks into social media-based communications, and/or a computing system implemented data management system, in accordance with at least one of the embodiments as described herein.

In various embodiments, business computing system 100 is any "computing system" such as, but not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, business computing system 100 is any "mobile device" and/or "mobile computing system" such as, but not limited to: a mobile "computing system"; a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

Sender/poster computing system 150 typically includes a CPU 151, an input/output (I/O) interface 155, and a memory system 153, including cache memory 153A. Similar to business computing system 100, sender/poster computing system 150 may further include standard user interface devices (not shown) such as a keyboard, a mouse, a printer, and a display device 157, as well as, one or more standard input/output (I/O) devices, such as a compact disk (CD) or DVD drive, floppy disk drive, or other digital or waveform port, or other device capable of inputting data to, and outputting data from, sender/poster computing system 150, whether available or known at the time of filing or as later developed.

In one embodiment, sender/poster computing system 150 also includes an Internet browser capability (not shown) that, in one embodiment, is stored, in whole or in part, in memory 153.

In one embodiment, memory system 153 includes all, or part of, a social media interface 193 for interacting with social media system 120 and social media 126, via one or more user interface display screens displayed on display device 157 and/or user input through a user interface device such as a keyboard, mouse, touchpad, voice command recognition system, or any other device capable of providing user input to a computing system or for translating user actions into computing system operations, whether available or known at the time of filing or as developed later.

As noted above, examples of social media system 120 and/or social media 126 include, but are not limed to Facebook™, MySpace™, Linkedin™, and Twitter™.

In one embodiment, memory system 153 includes all, or part of, original message/posting 154 that is an unmodified social media communication to be sent, and/or posted/broadcast, by a user of sender/poster computing system 150 and social media system 120, through social media system 120.

In one embodiment, sender/poster computing system 150 is accessible by one or more consumers/users.

In various embodiments, sender/poster computing system 150 is any "computing system" such as, but not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, sender/poster computing system 150 is any "mobile device" and/or "mobile computing system" such as, but not limited to: a mobile "computing system"; a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

Also seen in FIG. 1 is social media computing system 120 that typically includes a central processing unit (CPU) 121, a network interface 122, and a memory system 123. In one embodiment, memory system 123 includes all, or part of, a process for automated insertion of relevant hyperlinks into social media-based communications, such as process 200 in FIG. 1.

In one embodiment, memory system 123 includes all, or part of, trigger terms data 180 received, in one embodiment, from business computing system 100.

In one embodiment, memory system 123 includes all, or part of, modified message/posting 164 which represents a version of original message/posting 154 from sender/user computing system 150, and/or a response to the original message/posting 154, modified to include, and/or including, a hyperlink assigned to a detected trigger term inserted in the text of social media communication represented by original message/posting 154, and/or a response to the original message/posting 154, thereby transforming the social media communication text represented by original message/posting 154, and/or a response posting, into "modified business relevant social media communication text" represented by modified message/posting 164 that includes the relevant hyperlink to one or more webpages associated with the business, and/or one or more products associated with the business, and/or one or more services associated with the business, assigned to the detected trigger term.

Social media computing system 120 may further include a display device 125. As discussed in more detail below, in one embodiment, a process for automated insertion of relevant hyperlinks into social media-based communications 200 may be entered, in whole, or in part, into social media computing system 120 via an I/O device, such as from a CD, DVD, floppy disk, portable hard drive, memory stick, download site, or other medium and/or computer program product as defined herein.

As discussed above, currently available social media systems provide accounts, or a presence, for a first user, such as a sender/poster and/or user of sender/poster computing system 150, where the sender/poster can post entries, typically text entries of a defined size. The first user's entries are then made viewable, i.e., are "broadcast" to other users, such as consumers, who link to the first user's account/page and/or otherwise indicate they wish to see, and be informed of, the first user's posted entries.

Examples of currently available social media systems include, but are not limited to: Facebook™, MySpace™, Linkedin™, and Twitter™.

In one embodiment, social media computing system 120 is a computing system accessible by a consumer and/or business and is used and/or accessible by another computing system, such as business computing system 100 and/or sender/poster computing system 150, receiver/reader computing system 160 (discussed below), a workstation, a two-way pager, a cellular telephone, a smart phone, a digital wireless telephone, a Personal Digital Assistant (PDA), a server computer, an Internet appliance, any other device, or any desired combination of these devices, that includes components that can execute all, or part, of a process for automated insertion of relevant hyperlinks into social media-based communications, and/or a computing system implemented data management system, in accordance with at least one of the embodiments as described herein.

In various embodiments, social media computing system 120 is any "computing system" such as, but not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, social media computing system 120 is any "mobile device" and/or "mobile computing system" such as, but not limited to: a mobile "computing system"; a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

Receiver/reader computing system 160 typically includes a CPU 161, an input/output (I/O) interface 165, and a memory system 163, including cache memory 163A. Similar to business computing system 100, receiver/reader computing system 160 may further include standard user interface devices (not shown) such as a keyboard, a mouse, a printer, and a display device 167, as well as, one or more standard input/output (I/O) devices, such as a compact disk (CD) or DVD drive, floppy disk drive, or other digital or waveform port, or other device capable of inputting data to, and outputting data from, receiver/reader computing system 160, whether available or known at the time of filing or as later developed.

In one embodiment, receiver/reader computing system 160 also includes an Internet browser capability (not shown) that, in one embodiment, is stored, in whole or in part, in memory 163.

In one embodiment, memory system 163 includes all, or part of, a social media interface 195 for interacting with social media system 120 and social media 126, via one or more user interface display screens displayed on display device 167 and/or user input through a user interface device such as a keyboard, mouse, touchpad, voice command recognition system, or any other device capable of providing user input to a computing system or for translating user actions into computing system operations, whether available or known at the time of filing or as developed later.

As noted above, examples of social media system 120 and/or social media 126 include, but are not limed to Facebook™, MySpace™, Linkedin™, and Twitter™.

In one embodiment, memory system 153 includes all, or part of, modified message/posting 164 which represents a version of original message/posting 154 from sender/user computing system 150, and/or a response to the original message/posting 154, modified to include, and/or including, a hyperlink assigned to a detected trigger term inserted in the text of social media communication represented by original message/posting 154, and/or a response to the original message/posting 154, thereby transforming the social media communication text represented by original message/posting 154, and/or a response posting, into "modified business relevant social media communication text" represented by modified message/posting 164 that includes the relevant hyperlink to one or more webpages associated with the business, and/or one or more products associated with the business, and/or one or more services associated with the business, assigned to the detected trigger term.

In one embodiment, receiver/reader computing system 160 is accessible by one or more consumers/users.

In various embodiments, receiver/reader computing system 160 is any "computing system" such as, but not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, receiver/reader computing system 160 is any "mobile device" and/or "mobile computing system" such as, but not limited to: a mobile "computing system"; a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

Also shown in FIG. 1 is exemplary database 170. In one embodiment, database 170 is a data storage device, a designated server system or computing system, or a designated portion of one or more server systems or computing systems, such as computing systems 100, 150 and 120, or a distributed database, or an external and/or portable hard drive. In one embodiment, database 170 is a dedicated mass storage device implemented in software, hardware, or a combination of hardware and software. In one embodiment, database 170 is a web-based function. As discussed in more detail below, in one embodiment, database 170 is under the control of the user, and/or the user's agents, and/or process for automated insertion of relevant hyperlinks into social media-based communications, such as exemplary process 200. As discussed in more detail below, in one embodiment, database 170 is under the control of the business owner/manager, and/or the business owner's/manager's agents.

In various embodiments, database 170 can contain all, or part, of any data related to process for automated insertion of relevant hyperlinks into social media-based communications, such as exemplary process 200, as discussed herein, and/or as known in the art at the time of filing, and/or as developed after the time of filing.

In one embodiment, computing systems 100, 120, 150, and 160, and database 170, are coupled through network 130. Network 130 can be any network or network system that is of interest to a user such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

In various embodiments, any one or more of business computing system 100, sender/poster computing system 150, social media computing system 120, receiver/reader computing system 160, and/or database 170 are part of a cloud computing environment.

Those of skill in the art will readily recognize that the components shown in FIG. 1, such as business computing system 100, sender/poster computing system 150, social media computing system 120, receiver/reader computing system 160, and/or database 170 and their respective components, are shown for illustrative purposes only and that architectures with more or fewer components can implement, and benefit from, the invention. Moreover, one or more components of business computing system 100, sender/poster computing system 150, social media computing system 120, receiver/reader computing system 160, and/or database 170 may be located remotely from their respective system and accessed via network, as discussed herein. In addition, the particular type of, and configuration of, business computing system 100, sender/poster computing system 150, social media computing system 120, receiver/reader computing system 160, and/or database 170 are not relevant.

As discussed in more detail below, in one embodiment, a process for automated insertion of relevant hyperlinks into social media-based communications, such as process for automated insertion of relevant hyperlinks into social media-based communications 200, and/or social media, such as social media 126, and/or any data associated with a process for automated insertion of relevant hyperlinks into social media-based communications, such as process for automated insertion of relevant hyperlinks into social media-based communications 200, and/or social media, such as social media 126, are stored, in whole, or in part, in memory system 103 and/or cache memory 103A, of business computing system 100, and/or memory system 153 and/or cache memory 153A of sender/poster computing system 150, memory system 163 and/or cache memory 163A of receiver/reader computing system 160, and/or in memory system 123, and/or in database 170, and executed on business computing system 100, and/or sender/poster computing system 150, and/or social media computing system 120, and/or receiver/reader computing system 160. As used herein, a memory refers to a volatile memory, a non-volatile memory, or any combination of the two.

Although a process for automated insertion of relevant hyperlinks into social media-based communications, such as process for automated insertion of relevant hyperlinks into social media-based communications 200, and/or social media, such as social media 126, and/or any data associated with a process for automated insertion of relevant hyperlinks into social media-based communications, such as process for automated insertion of relevant hyperlinks into social media-based communications 200, and/or social media, such as social media 126, are sometimes referred to herein, alternatively, as a process, an application, a module, a program, a component of a software system, a component of a software package, a component of a parent system, a plug-in, or a feature of a parent system, this terminology is illustrative only. In some embodiments, a process for automated insertion of relevant hyperlinks into social media-based communications, such as process for automated insertion of relevant hyperlinks into social media-based communications 200, and/or social media, such as social media 126, and/or any data associated with a process for automated insertion of relevant hyperlinks into social media-based communications, such as process for automated insertion of relevant hyperlinks into social media-based communications 200, and/or social media, such as social media 126, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101, 121, 161 and 151. In one embodiment, execution of a process by CPU 101, CPU 121, CPU 151, CPU 161 results in the operations of an agent computer process (not shown) and/or a rule computer process (not shown).

In one embodiment, a process for automated insertion of relevant hyperlinks into social media-based communications, such as process for automated insertion of relevant hyperlinks into social media-based communications 200, and/or social media, such as social media 126, and/or any data associated with a process for automated insertion of relevant hyperlinks into social media-based communications, such as process for automated insertion of relevant hyperlinks into social media-based communications 200, and/or social media, such as social media 126, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as social media computing system 120 of FIG. 1, or other media or process capable of delivering computer readable data representing computer readable code, whether available or known at the time of filing or as later developed. This medium may belong to a computing system. However, in some embodiments, the medium also may be removable and/or remote from the computing system.

In one embodiment, the computing systems and/or server systems, such as computing systems 100, 120, 150 and/or 160 of FIG. 1, running and/or utilizing and/or storing all, or part, of a process for automated insertion of relevant hyperlinks into social media-based communications, such as process for automated insertion of relevant hyperlinks into social media-based communications 200, and/or social media, such as social media 126, and/or any data associated with a process for automated insertion of relevant hyperlinks into social media-based communications, such as process for automated insertion of relevant hyperlinks into social media-based communications 200, and/or social media, such as social media 126, is a portable computer, a workstation, a two-way pager, a cellular telephone, a smart phone, a digital wireless telephone, a PDA, a server computer, an Internet appliance, or any other device that includes components that can execute all, or part, of a process for automated insertion of relevant hyperlinks into social media-based communications in accordance with at least one of the embodiments as described herein. Similarly, in another embodiment, a process for automated insertion of relevant hyperlinks into social media-based communications, such as process for automated insertion of relevant hyperlinks into social media-based communications 200, and/or social media, such as social media 126, and/or any data associated with a process for automated insertion of relevant hyperlinks into social media-based communications, such as process for automated insertion of relevant hyperlinks into social media-based communications 200, and/or social media, such as social media 126, may be implemented on, and/or run, and/or stored on, a computing system and/or server system that is comprised of multiple different computers, wireless devices, cellular telephones, digital telephones, two-way pagers, personal digital assistants, server computers, or any desired combination of these devices, that are coupled to perform the processes and/or operations as described herein.

Process

Herein the term "social media communication" includes an original, or initial, message and/or posting made via a social media system and/or any response to, or thread related to, the original, or initial, message and/or posting made via a social media system.

Herein the term "business relevant social media communication" includes an original, or initial, message and/or posting made via a social media system that is identified as being relevant to a business and/or product and/or service, and/or any response to, or thread related to, the original, or initial, message and/or posting identified as being relevant to a business and/or product and/or service made via a social media system.

Herein, the terms "business", "merchant", "manager", "provider of products and services" and "seller", are used interchangeably and include, but are not limited to, providers of goods and services, and other advertisers, and/or any party and/or entity that interfaces with, and/or to whom information is provided by, a process for automated insertion of relevant hyperlinks into social media-based communications, and/or a person and/or entity that interfaces with, and/or to whom information is provided by, a process for automated insertion of relevant hyperlinks into social media-based communications, and/or any authorized agent of any party and/or person and/or entity that interfaces with, and/or to whom information is provided by, a process for automated insertion of relevant hyperlinks into social media-based communications.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Herein, the term "mobile device" and/or "mobile computing system" are used interchangeable and include, but are not limited to: a mobile "computing system"; a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed. As used herein the term "network" also includes, but is not limited to, any mobile communication network.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In accordance with one embodiment, using a process for automated insertion of relevant hyperlinks into social media-based communications, a business owner, and/or a provider of products and/or services, or any other party, defines one or more trigger terms associated with the business, and/or one or more products associated with the business, and/or one or more services associated with the business. In one embodiment, for each defined trigger term, one or more hyperlinks to one or more webpages associated with the business, and/or one or more products associated with the business, and/or one or more services associated with the business, is assigned to the trigger term. In one embodiment, social media communications associated with one or more social media systems are monitored, and/or scanned, for the defined one or more trigger terms. In one embodiment, if a trigger term is detected in the text of a social media communication, the status of the social media communication is transformed to the status of "business relevant social media communication" and the hyperlink assigned to the detected trigger term is inserted in the text of original social media communication, and/or a response to the original social media communication, thereby transforming the social media communication text into "modified business relevant social media communication text" that includes the relevant hyperlink to one or more webpages associated with the business, and/or one or more products associated with the business, and/or one or more services associated with the business assigned to the detected trigger term. In one embodiment, the business relevant social media communication, including the modified business relevant social media communication text, is then sent, and/or posted, through, and/or on, the social media system.

Figure 2:
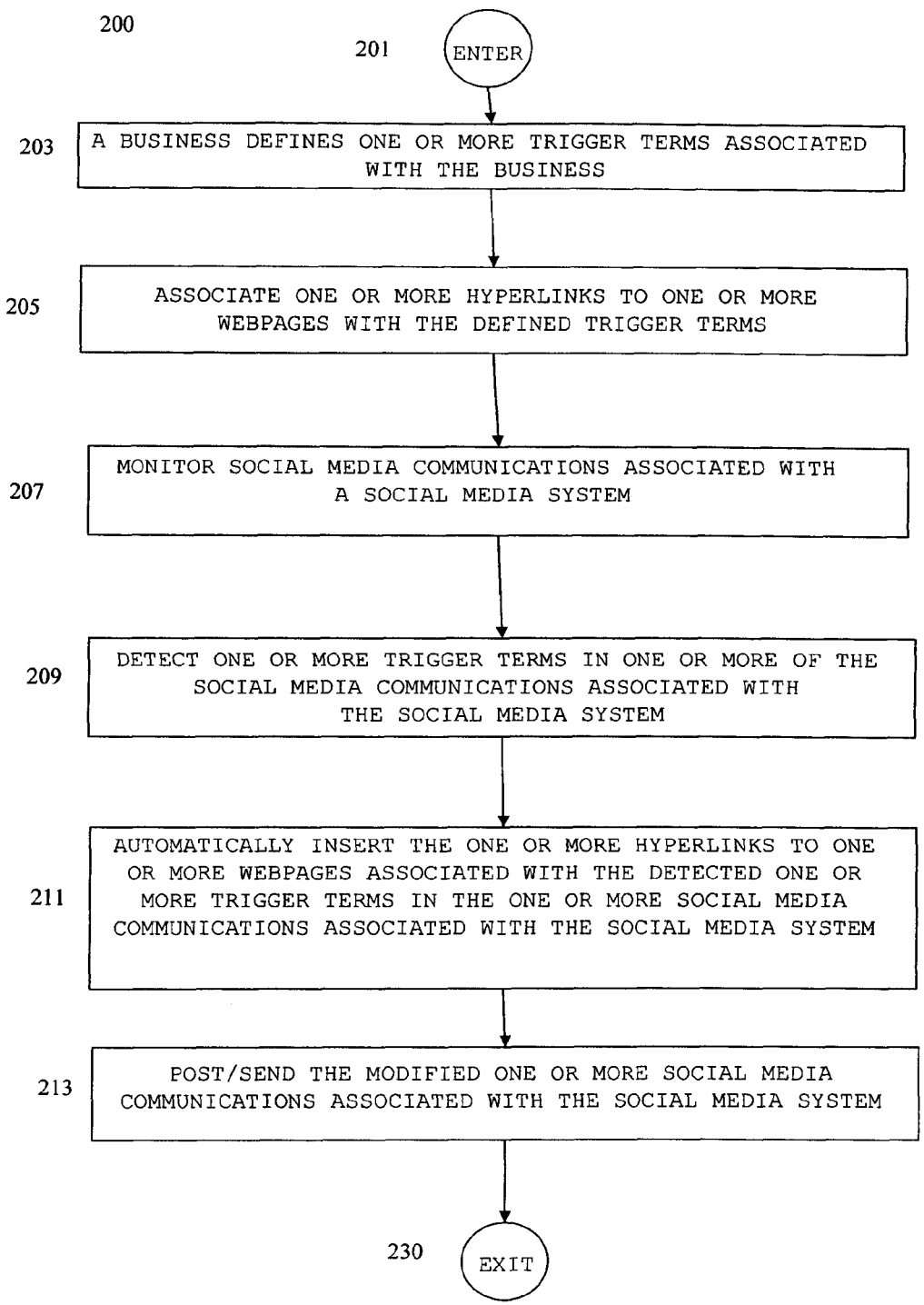
FIG. 2 is a flow chart depicting one embodiment of a process for automated insertion of relevant hyperlinks into social media-based communications in accordance with one embodiment.

FIG. 2 is a flow chart depicting a process for automated insertion of relevant hyperlinks into social media-based communications 200 in accordance with one embodiment. Process for automated insertion of relevant hyperlinks into social media-based communications 200 begins at ENTER OPERATION 201 of FIG. 2 and process flow proceeds to A BUSINESS DEFINES ONE OR MORE TRIGGER TERMS ASSOCIATED WITH THE BUSINESS OPERATION 203.

In one embodiment, at A BUSINESS DEFINES ONE OR MORE TRIGGER TERMS ASSOCIATED WITH THE BUSINESS OPERATION 203 a business owner, and/or a provider of products and/or services, or any other party, defines one or more trigger terms associated with the business, and/or one or more products associated with the business, and/or one or more services associated with the business.

In various embodiments, the trigger terms of A BUSINESS DEFINES ONE OR MORE TRIGGER TERMS ASSOCIATED WITH THE BUSINESS OPERATION 203 include, but are not limited to, any one or more of the following: any term, phrase, symbol, abbreviation, or slang, in one or more languages, associated, directly or indirectly, with the business, provider of products, provider of services, or associate or agent thereof; any term, phrase, symbol, abbreviation, or slang, in one or more languages, associated, directly or indirectly, with any products, product brand names, product brand lines, product features, and/or product stores associated with the business, provider of products, provider of services, or associate or agent thereof; any term, phrase, symbol, abbreviation, or slang, in one or more languages, associated, directly or indirectly, with any services, service brand names, service brand lines, service features, and/or service stores associated with the business, provider of products, provider of services, or associate or agent thereof; and/or any term, phrase, symbol, abbreviation, or slang, in one or more languages, whether protected by intellectual property rights or not, desired by the business, provider of products, provider of services, or associate or agent thereof, as discussed herein, and/or as known in the art at the time of filing, and/or as developed after the time of filing.

In one embodiment, at A BUSINESS DEFINES ONE OR MORE TRIGGER TERMS ASSOCIATED WITH THE BUSINESS OPERATION 203 data representing the one or more trigger terms associated with the business, and/or one or more products associated with the business, and/or one or more services associated with the business is stored in a memory system, or database, or in a cache memory, or in any main memory or mass memory, associated with any computing system as discussed herein, and/or as known in the art at the time of filing, and/or as developed after the time of filing.

In various embodiments, at A BUSINESS DEFINES ONE OR MORE TRIGGER TERMS ASSOCIATED WITH THE BUSINESS OPERATION 203 the data representing the one or more trigger terms in whole, or in part, is stored in any computing system, such as computing systems 100, 150, 160

FIG. 1, and/or server system, such as computing system 120 of FIG. 1, and/or a database, such as database 170 of FIG. 1, or any other device, in another location, or on/in a computer readable medium, and/or any other computer program product, as defined herein.

Returning to FIG. 2, at A BUSINESS DEFINES ONE OR MORE TRIGGER TERMS ASSOCIATED WITH THE BUSINESS OPERATION 203 the data representing the one or more trigger terms, in whole, or in part, is stored on a webpage, in a web-based system or on a public network such as the Internet.

In one embodiment, once a business owner, and/or a provider of products and/or services, or any other party, defines one or more trigger terms associated with the business, and/or one or more products associated with the business, and/or one or more services associated with the business at A BUSINESS DEFINES ONE OR MORE TRIGGER TERMS ASSOCIATED WITH THE BUSINESS OPERATION 203 process flow proceeds to ASSOCIATE ONE OR MORE HYPERLINKS TO ONE OR MORE WEBPAGES WITH THE DEFINED TRIGGER TERMS OPERATION 205.

In one embodiment, at ASSOCIATE ONE OR MORE HYPERLINKS TO ONE OR MORE WEBPAGES WITH THE DEFINED TRIGGER TERMS OPERATION 205 for each defined trigger term of A BUSINESS DEFINES ONE OR MORE TRIGGER TERMS ASSOCIATED WITH THE BUSINESS OPERATION 203, one or more hyperlinks to one or more webpages associated with the business, and/or one or more products associated with the business, and/or one or more services associated with the business, is assigned to the trigger term.

In various embodiments, the hyperlinks of ASSOCIATE ONE OR MORE HYPERLINKS TO ONE OR MORE WEBPAGES WITH THE DEFINED TRIGGER TERMS OPERATION 205 are associated with webpages on a network, such as network 130 of FIG. 1, and/or the Internet.

Returning to FIG. 2, in various embodiments, the hyperlinks of ASSOCIATE ONE OR MORE HYPERLINKS TO ONE OR MORE WEBPAGES WITH THE DEFINED TRIGGER TERMS OPERATION 205 are associated with webpages provided by one or more processors, such as CPUs 101, 151, 121, and/or 161 of FIG. 1, associated with one or more computing systems, such as computing systems 100, 150, 120 and/or 160 of FIG. 1.

Returning to FIG. 2, in various embodiments, the hyperlinks of ASSOCIATE ONE OR MORE HYPERLINKS TO ONE OR MORE WEBPAGES WITH THE DEFINED TRIGGER TERMS OPERATION 205 are associated with webpages provided by a database, such as database 170 of FIG. 1.

Returning to FIG. 2, in various embodiments, the webpages accessed via the hyperlinks of ASSOCIATE ONE OR MORE HYPERLINKS TO ONE OR MORE WEBPAGES WITH THE DEFINED TRIGGER TERMS OPERATION 205 provide, but are not limited to, one or more of the following: information associated with the business, and/or one more providers of the product and/or service; contact information for the business, and/or one more providers of the product and/or service; locations of the business, and/or one more providers of the product and/or service; maps associated with the business, and/or one more providers of the product and/or service; information regarding any products, product brand names, product brand lines, product features, and/or product stores, associated with the business, provider of products, provider of services, or associate or agent thereof; information regarding any services, service brand names, service brand lines, service features, and/or service stores, associated with the business, provider of products, provider of services, or associate or agent thereof; and/or any other information desired by the business, provider of products, provider of services, or associate or agent thereof, as discussed herein, and/or as known in the art at the time of filing, and/or as developed after the time of filing.

In various embodiments, the hyperlinks of ASSOCIATE ONE OR MORE HYPERLINKS TO ONE OR MORE WEBPAGES WITH THE DEFINED TRIGGER TERMS OPERATION 205 and/or webpages are selected to be assigned to a given trigger term based on secondary analysis such as, but not limited to: the location of the sender and/or receiver of the social media communication, as determined in one embodiment, by the IP address associated with the sender and/or receiver of the social media communication; the language used in the social media communication; the specific social media system used; the specific type of social media communication; any other text of the social media communication; and/or any other secondary analysis desired by the business, provider of products, provider of services, or associate or agent thereof, as discussed herein, and/or as known in the art at the time of filing, and/or as developed after the time of filing.

In one embodiment, at ASSOCIATE ONE OR MORE HYPERLINKS TO ONE OR MORE WEBPAGES WITH THE DEFINED TRIGGER TERMS OPERATION 205 data indicating the defined trigger terms, the hyperlinks assigned to the trigger terms, and the association of the defined trigger terms and the hyperlinks assigned to the trigger terms, is stored in a memory system, or database, or in a cache memory, or in any main memory or mass memory, associated with any computing system as discussed herein, and/or as known in the art at the time of filing, and/or as developed after the time of filing.

In various embodiments, at ASSOCIATE ONE OR MORE HYPERLINKS TO ONE OR MORE WEBPAGES WITH THE DEFINED TRIGGER TERMS OPERATION 205 data indicating the defined trigger terms, the hyperlinks assigned to the trigger terms, and the association of the defined trigger terms and the hyperlinks assigned to the trigger terms in whole, or in part, is stored in any computing system, such as computing systems 100, 150, 160 FIG. 1, and/or server system, such as computing system 120 of FIG. 1, and/or a database, such as database 170 of FIG. 1, or any other device, in another location, or on/in a computer readable medium, and/or any other computer program product, as defined herein.

Returning to FIG. 2, at ASSOCIATE ONE OR MORE HYPERLINKS TO ONE OR MORE WEBPAGES WITH THE DEFINED TRIGGER TERMS OPERATION 205 data indicating the defined trigger terms, the hyperlinks assigned to the trigger terms, and the association of the defined trigger terms and the hyperlinks assigned to the trigger terms, in whole, or in part, is stored on a webpage, in a web-based system or on a public network such as the Internet.

In one embodiment, once for each defined trigger term of A BUSINESS DEFINES ONE OR MORE TRIGGER TERMS ASSOCIATED WITH THE BUSINESS OPERATION 203, one or more hyperlinks to one or more webpages associated with the business, and/or one or more products associated with the business, and/or one or more services associated with the business, is assigned to the trigger term at ASSOCIATE ONE OR MORE HYPERLINKS TO ONE OR MORE WEBPAGES WITH THE DEFINED TRIGGER TERMS OPERATION 205 process flow proceeds to MONITOR SOCIAL MEDIA COMMUNICATIONS ASSOCIATED WITH A SOCIAL MEDIA SYSTEM OPERATION 207.

In one embodiment, at MONITOR SOCIAL MEDIA COMMUNICATIONS ASSOCIATED WITH A SOCIAL MEDIA SYSTEM OPERATION 207 social media communications associated with one or more social media systems are monitored, and/or scanned, for the defined one or more trigger terms of A BUSINESS DEFINES ONE OR MORE TRIGGER TERMS ASSOCIATED WITH THE BUSINESS OPERATION 203.

In one embodiment, at MONITOR SOCIAL MEDIA COMMUNICATIONS ASSOCIATED WITH A SOCIAL MEDIA SYSTEM OPERATION 207 social media communications, such as original message/posting 154 of FIG. 1, associated with one or more social media systems, such as social media computing system 120, and/or social media 126, of FIG. 1 are monitored, and/or scanned, for the defined one or more trigger terms of A BUSINESS DEFINES ONE OR MORE TRIGGER TERMS ASSOCIATED WITH THE BUSINESS OPERATION 203 (FIG. 2).

In one embodiment, at MONITOR SOCIAL MEDIA COMMUNICATIONS ASSOCIATED WITH A SOCIAL MEDIA SYSTEM OPERATION 207, social media communications, such as, but not limited to: messages, and/or response to messages, and/or treads of messages; SMS text, tweets, and/or responses to tweets, and/or threads of tweets; or postings, and/or responses to postings, and/or treads of postings, are monitored/scanned for the defined one or more trigger terms using one or more processors, such as CPU 101 and/or CPU 121 of FIG. 1, associated with one or more computing systems, such as business computing system 100 and/or social media computing system 120 of FIG. 1.

Returning to FIG. 2, in one embodiment, at MONITOR SOCIAL MEDIA COMMUNICATIONS ASSOCIATED WITH A SOCIAL MEDIA SYSTEM OPERATION 207 social media communications associated with one or more social media systems are monitored, and/or scanned, for the defined one or more trigger terms in cooperation with the one or more social media systems and/or one or more users of the one or more social media systems.

Methods, means, mechanisms, processes, and procedures for trapping, buffering, scanning, and monitoring communications, messages, and postings, are well known in the art and will vary from social media system-to-social media system. Therefore, a more detailed discussion of specific methods, means, mechanisms, processes, and procedures for monitoring, and/or scanning, social media communications associated with one or more social media systems for defined one or more trigger terms is omitted here to avoid detracting from the invention.

In one embodiment, once social media communications associated with one or more social media systems are monitored, and/or scanned, for the defined one or more trigger terms at MONITOR SOCIAL MEDIA COMMUNICATIONS ASSOCIATED WITH A SOCIAL MEDIA SYSTEM OPERATION 207 process flow proceeds to DETECT ONE OR MORE TRIGGER TERMS IN ONE OR MORE OF THE SOCIAL MEDIA COMMUNICATIONS ASSOCIATED WITH THE SOCIAL MEDIA SYSTEM OPERATION 209.

In one embodiment, at DETECT ONE OR MORE TRIGGER TERMS IN ONE OR MORE OF THE SOCIAL MEDIA COMMUNICATIONS ASSOCIATED WITH THE SOCIAL MEDIA SYSTEM OPERATION 209 a trigger term of A BUSINESS DEFINES ONE OR MORE TRIGGER TERMS ASSOCIATED WITH THE BUSINESS OPERATION 203 is detected in the text of a social media communication during the analysis of MONITOR SOCIAL MEDIA COMMUNICATIONS ASSOCIATED WITH A SOCIAL MEDIA SYSTEM OPERATION 207 and the status of the social media communication is transformed to the status of "business relevant social media communication".

In one embodiment, at DETECT ONE OR MORE TRIGGER TERMS IN ONE OR MORE OF THE SOCIAL MEDIA COMMUNICATIONS ASSOCIATED WITH THE SOCIAL MEDIA SYSTEM OPERATION 209 a trigger term of A BUSINESS DEFINES ONE OR MORE TRIGGER TERMS ASSOCIATED WITH THE BUSINESS OPERATION 203 is detected in the text of a social media communication during the analysis of MONITOR SOCIAL MEDIA COMMUNICATIONS ASSOCIATED WITH A SOCIAL MEDIA SYSTEM OPERATION 207 and the status of the social media communication is transformed to the status of "business relevant social media communication" using one or more processors, such as CPU 121 of FIG. 1, associated with one or more computing systems, such as social media computing system 120 of FIG. 1.

Returning to FIG. 2, in one embodiment, once a trigger term of A BUSINESS DEFINES ONE OR MORE TRIGGER TERMS ASSOCIATED WITH THE BUSINESS OPERATION 203 is detected in the text of a social media communication during the analysis of MONITOR SOCIAL MEDIA COMMUNICATIONS ASSOCIATED WITH A SOCIAL MEDIA SYSTEM OPERATION 207 and the status of the social media communication is transformed to the status of "business relevant social media communication" at DETECT ONE OR MORE TRIGGER TERMS IN ONE OR MORE OF THE SOCIAL MEDIA COMMUNICATIONS ASSOCIATED WITH THE SOCIAL MEDIA SYSTEM OPERATION 209 process flow proceeds to AUTOMATICALLY INSERT THE ONE OR MORE HYPERLINKS TO ONE OR MORE WEBPAGES ASSOCIATED WITH THE DETECTED ONE OR MORE TRIGGER TERMS IN THE ONE OR MORE SOCIAL MEDIA COMMUNICATIONS ASSOCIATED WITH THE SOCIAL MEDIA SYSTEM OPERATION 211.

Herein the term "social media communication" includes an original, or initial, message and/or posting made via a social media system and/or any response to, or thread related to, the original, or initial, message and/or posting made via a social media system.

Herein the term "business relevant social media communication" includes an original, or initial, message and/or posting made via a social media system that is identified as being relevant to a business and/or product and/or service, and/or any response to, or thread related to, the original, or initial, message and/or posting identified as being relevant to a business and/or product and/or service made via a social media system.

In one embodiment, at AUTOMATICALLY INSERT THE ONE OR MORE HYPERLINKS TO ONE OR MORE WEBPAGES ASSOCIATED WITH THE DETECTED ONE OR MORE TRIGGER TERMS IN THE ONE OR MORE SOCIAL MEDIA COMMUNICATIONS ASSOCIATED WITH THE SOCIAL MEDIA SYSTEM OPERATION 211 the hyperlink of ASSOCIATE ONE OR MORE HYPERLINKS TO ONE OR MORE WEBPAGES WITH THE DEFINED TRIGGER TERMS OPERATION 205 assigned to the detected trigger term of DETECT ONE OR MORE TRIGGER TERMS IN ONE OR MORE OF THE SOCIAL MEDIA COMMUNICATIONS ASSOCIATED WITH THE SOCIAL MEDIA SYSTEM OPERATION 209 is inserted in the text of the original social media communication of DETECT ONE OR MORE TRIGGER TERMS IN ONE OR MORE OF THE SOCIAL MEDIA COMMUNICATIONS ASSOCIATED WITH THE SOCIAL MEDIA SYSTEM OPERATION 209, thereby transforming the social media communication text of DETECT ONE OR MORE TRIGGER TERMS IN ONE OR MORE OF THE SOCIAL MEDIA COMMUNICATIONS ASSOCIATED WITH THE SOCIAL MEDIA SYSTEM OPERATION 209 into "modified business relevant social media communication text" that includes the relevant hyperlink to one or more webpages associated with the business, and/or one or more products associated with the business, and/or one or more services associated with the business assigned to the detected trigger term.

In one embodiment, at AUTOMATICALLY INSERT THE ONE OR MORE HYPERLINKS TO ONE OR MORE WEBPAGES ASSOCIATED WITH THE DETECTED ONE OR MORE TRIGGER TERMS IN THE ONE OR MORE SOCIAL MEDIA COMMUNICATIONS ASSOCIATED WITH THE SOCIAL MEDIA SYSTEM OPERATION 211 the hyperlink of ASSOCIATE ONE OR MORE HYPERLINKS TO ONE OR MORE WEBPAGES WITH THE DEFINED TRIGGER TERMS OPERATION 205 assigned to the detected trigger term of DETECT ONE OR MORE TRIGGER TERMS IN ONE OR MORE OF THE SOCIAL MEDIA COMMUNICATIONS ASSOCIATED WITH THE SOCIAL MEDIA SYSTEM OPERATION 209 is inserted in the text of a response to the original social media communication of DETECT ONE OR MORE TRIGGER TERMS IN ONE OR MORE OF THE SOCIAL MEDIA COMMUNICATIONS ASSOCIATED WITH THE SOCIAL MEDIA SYSTEM OPERATION 209, thereby transforming the response to the social media communication text of DETECT ONE OR MORE TRIGGER TERMS IN ONE OR MORE OF THE SOCIAL MEDIA COMMUNICATIONS ASSOCIATED WITH THE SOCIAL MEDIA SYSTEM OPERATION 209 into "modified business relevant social media communication text" that includes the relevant hyperlink to one or more webpages associated with the business, and/or one or more products associated with the business, and/or one or more services associated with the business assigned to the detected trigger term.

In one embodiment, once the hyperlink of ASSOCIATE ONE OR MORE HYPERLINKS TO ONE OR MORE WEBPAGES WITH THE DEFINED TRIGGER TERMS OPERATION 205 assigned to the detected trigger term of DETECT ONE OR MORE TRIGGER TERMS IN ONE OR MORE OF THE SOCIAL MEDIA COMMUNICATIONS ASSOCIATED WITH THE SOCIAL MEDIA SYSTEM OPERATION 209 is inserted in the text of the original social media communication of DETECT ONE OR MORE TRIGGER TERMS IN ONE OR MORE OF THE SOCIAL MEDIA COMMUNICATIONS ASSOCIATED WITH THE SOCIAL MEDIA SYSTEM OPERATION 209, and/or a response to the original social media communication of DETECT ONE OR MORE TRIGGER TERMS IN ONE OR MORE OF THE SOCIAL MEDIA COMMUNICATIONS ASSOCIATED WITH THE SOCIAL MEDIA SYSTEM OPERATION 209, at AUTOMATICALLY INSERT THE ONE OR MORE HYPERLINKS TO ONE OR MORE WEBPAGES ASSOCIATED WITH THE DETECTED ONE OR MORE TRIGGER TERMS IN THE ONE OR MORE SOCIAL MEDIA COMMUNICATIONS ASSOCIATED WITH THE SOCIAL MEDIA SYSTEM OPERATION 211 process flow proceeds to POST/SEND THE MODIFIED ONE OR MORE SOCIAL MEDIA COMMUNICATIONS ASSOCIATED WITH THE SOCIAL MEDIA SYSTEM OPERATION 213.

In one embodiment, at POST/SEND THE MODIFIED ONE OR MORE SOCIAL MEDIA COMMUNICATIONS ASSOCIATED WITH THE SOCIAL MEDIA SYSTEM OPERATION 213 the business relevant social media communication, i.e., the modified original business relevant social media communication and/or a response to the original business relevant social media communication, of AUTOMATICALLY INSERT THE ONE OR MORE HYPERLINKS TO ONE OR MORE WEBPAGES ASSOCIATED WITH THE DETECTED ONE OR MORE TRIGGER TERMS IN THE ONE OR MORE SOCIAL MEDIA COMMUNICATIONS ASSOCIATED WITH THE SOCIAL MEDIA SYSTEM OPERATION 211, including the modified business relevant social media communication text, is then sent, and/or posted, through, and/or on, the social media system.

In one embodiment, at POST/SEND THE MODIFIED ONE OR MORE SOCIAL MEDIA COMMUNICATIONS ASSOCIATED WITH THE SOCIAL MEDIA SYSTEM OPERATION 213 the business relevant social media communication of AUTOMATICALLY INSERT THE ONE OR MORE HYPERLINKS TO ONE OR MORE WEBPAGES ASSOCIATED WITH THE DETECTED ONE OR MORE TRIGGER TERMS IN THE ONE OR MORE SOCIAL MEDIA COMMUNICATIONS ASSOCIATED WITH THE SOCIAL MEDIA SYSTEM OPERATION 211, including the modified business relevant social media communication text, is then sent, and/or posted, through, and/or on, the social media system.

In one embodiment, at POST/SEND THE MODIFIED ONE OR MORE SOCIAL MEDIA COMMUNICATIONS ASSOCIATED WITH THE SOCIAL MEDIA SYSTEM OPERATION 213 the business relevant social media communication of AUTOMATICALLY INSERT THE ONE OR MORE HYPERLINKS TO ONE OR MORE WEBPAGES ASSOCIATED WITH THE DETECTED ONE OR MORE TRIGGER TERMS IN THE ONE OR MORE SOCIAL MEDIA COMMUNICATIONS ASSOCIATED WITH THE SOCIAL MEDIA SYSTEM OPERATION 211, including the modified business relevant social media communication text, is then sent, and/or posted, through, and/or on, the social media system as intended by the sender/poster of the original, unmodified, social media communication using one or more processors, such as CPUs 101, 121, 151 and/or 161, of FIG. 1, associated with one or more computing systems, such as computing systems 100, 120, 150, and/or 160 of FIG. 1, and the entry is automatically posted with the social media system via a network, such as network 130 of FIG. 1, and/or one or more computing systems, such as social media computing system 120 of FIG. 1.

As a specific illustrative example of the operation of one embodiment of process for automated insertion of relevant hyperlinks into social media-based communications 200, assume that Nike™ signs up for process for automated insertion of relevant hyperlinks into social media-based communications 200 with Twitter™ being the social media system.

In this one specific illustrative example, at A BUSINESS DEFINES ONE OR MORE TRIGGER TERMS ASSOCIATED WITH THE BUSINESS OPERATION 203 Nike™ defines the trigger terms "Nike", "shoes", "Nike shoes", "Nike Clothing", "Nike Gear", "Nike Sport".

In this one specific illustrative example, at ASSOCIATE ONE OR MORE HYPERLINKS TO ONE OR MORE WEBPAGES WITH THE DEFINED TRIGGER TERMS OPERATION 205 the hyperlink 'http://store.nike.com/us/en_us/?l=shop,pdp,ctr-inline/cid-1/pid-320072/pgid-283075' is associated with these trigger terms.

In this one specific illustrative example, at MONITOR SOCIAL MEDIA COMMUNICATIONS ASSOCIATED WITH A SOCIAL MEDIA SYSTEM OPERATION 207

"Tweets™" sent via Twitter™ are monitored as described above for the defined trigger terms.

In this one specific illustrative example, assume a Twitter™ user "Tweets™" the following: "where can i buy nike lunarlite shoes here in manila".

In this one specific illustrative example, at DETECT ONE OR MORE TRIGGER TERMS IN ONE OR MORE OF THE SOCIAL MEDIA COMMUNICATIONS ASSOCIATED WITH THE SOCIAL MEDIA SYSTEM OPERATION 209 the terms "nike" and "shoes" are detected and identified as trigger terms. consequently, at AUTOMATICALLY INSERT THE ONE OR MORE HYPERLINKS TO ONE OR MORE WEBPAGES ASSOCIATED WITH THE DETECTED ONE OR MORE TRIGGER TERMS IN THE ONE OR MORE SOCIAL MEDIA COMMUNICATIONS ASSOCIATED WITH THE SOCIAL MEDIA SYSTEM OPERATION 211 the hyperlink 'http://store.nike.com/us/en_us/?1=shop,pdp,ctr-inline/cid-1/pid-320072/pgid-283075' is inserted in the "tweet" and/or a response to the "tweet".

In addition, in this one specific illustrative example, assume the hyperlinks and/or webpages are selected at ASSOCIATE ONE OR MORE HYPERLINKS TO ONE OR MORE WEBPAGES WITH THE DEFINED TRIGGER TERMS OPERATION 205 to be assigned to a given trigger term based on secondary analysis such as, but not limited to: the location of the sender and/or receiver of the social media communication, as determined in one embodiment, by the IP address associated with the sender and/or receiver of the social media communication; the language used in the social media communication; the specific social media system used; the specific type of social media communication; any other text of the social media communication; and/or any other secondary analysis desired by the business, provider of products, provider of services, or associate or agent thereof, as discussed herein, and/or as known in the art at the time of filing, and/or as developed after the time of filing.

In this case the text "manila" in the original "Tweet™", in addition to the detected term "nike" would cause the following link(s) to be inserted into the identified business relevant social media communication: "http://nike.com.ph/web/store-locator/store.htm" which includes the address of a Nike™ outlet in Manila and/or the hyperlink; and/or "http://maps.google.co.in/maps/place?um=1&ie=UTF-8&q.nike+manila&fb=1&gl=in&hq=nike&hnear=Manila,+Philippines&cid=9474258386018515268" showing a map to the Nike™ outlet in Manila.

In this one specific illustrative example, the modified "tweet", and/or response, including the transformed business relevant social media communication text with the above hyperlinks, is sent, and/or posted, through, and/or on, "Twitter™", just as the sender had intended.

In various embodiments, with minor modifications, process for automated insertion of relevant hyperlinks into social media-based communications 200 can be applied to other information systems such as, but not limited to, search engine results, e-mail systems, more general SMS messaging systems, and/or any information systems as discussed herein, and/or as known in the art at the time of filing, and/or as developed after the time of filing.

Returning to FIG. 2, in one embodiment, once the business relevant social media communication of AUTOMATICALLY INSERT THE ONE OR MORE HYPERLINKS TO ONE OR MORE WEBPAGES ASSOCIATED WITH THE DETECTED ONE OR MORE TRIGGER TERMS IN THE ONE OR MORE SOCIAL MEDIA COMMUNICATIONS ASSOCIATED WITH THE SOCIAL MEDIA SYSTEM OPERATION 211, including the modified business relevant social media communication text, is then sent, and/or posted, through, and/or on, the social media system at POST/SEND THE MODIFIED ONE OR MORE SOCIAL MEDIA COMMUNICATIONS ASSOCIATED WITH THE SOCIAL MEDIA SYSTEM OPERATION 213 process flow proceeds to EXIT OPERATION 230. In one embodiment, at EXIT OPERATION 230 process for automated insertion of relevant hyperlinks into social media-based communications 200 is exited to await new data and/or a newly detected trigger event.

In the discussion above, certain aspects of one embodiment include process steps or operations or instructions described herein for illustrative purposes in a particular order or grouping. However, the particular order or grouping shown and discussed herein is illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein does not limit the scope of the invention as claimed below.

Using one embodiment of process for automated insertion of relevant hyperlinks into social media-based communications 200, business relevant social media communications are identified and are transformed to include hyperlinks to the data/information required to provide accurate, or complete, information regarding the businesses, products, and/or services referenced in the message posting. Consequently, using process for automated insertion of relevant hyperlinks into social media-based communications 200, business owners, and/or providers of products and/or services, are provided the opportunity to inject accurate information about their products and/or services into business relevant social media communications and users of the social media systems are provided the accurate information about products and/or services that they desire.

In addition, since process for automated insertion of relevant hyperlinks into social media-based communications 200 uses hyperlinks to provide the accurate, or complete, information regarding the businesses, products, and/or services referenced in the message posting, the information can usually be made available without violating any message/posting size, and/or number of character, restrictions imposed by the social media system. Consequently, using process for automated insertion of relevant hyperlinks into social media-based communications 200, both businesses and social media system users are benefitted.

As discussed in more detail above, using the above embodiments, with little or no modification and/or healthcare consumer input, there is considerable flexibility, adaptability, and opportunity for customization to meet the specific needs of various healthcare consumers under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted.

In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "detecting", "inserting", "posting", "sending", "obtaining", "establishing", "posting", "intercepting", "accessing", "scanning", "transforming", "linking", "verifying", "monitoring", "browsing", "updating", "associating", "analyzing", "defining", "storing", "saving", "displaying", "implementing", "performing", "creating", "assigning", "estimating", "entering", "modifying", "categorizing", "providing", "processing", "accessing", "selecting", "scheduling", "creating", "using", "comparing", "submitting", "generating", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus.

Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for automated insertion of relevant hyperlinks into social media-based communications comprising:
    obtaining data defining one or more trigger terms associated with one or more of a business, product, and service;
    monitoring social media communications associated with a social media system for one or more defined trigger terms;
    detecting a defined trigger term in an original social media communication message associated with the social media system, and determining a location of an intended receiver of the original social media communication message, the detected defined trigger term being a defined trigger term contained within an original social media communication message originated by a sender and intended to be received by the intended receiver, the sender and intended receiver being parties of the original social media communication message;

assigning one or more hyperlinks to the trigger term based on the determined receiver location;

inserting the one or more assigned hyperlinks of one or more webpages associated with the detected trigger term into the original social media communication message, resulting in social media communication message; and sending the modified social media communication message to the intended receiver through the social media system.

2. The method for automated insertion of relevant hyperlinks into social media-based communications of claim 1, wherein;

at least one of the one or more trigger terms associated with one or more of a business, product, and service is selected from the group of trigger terms consisting of:

any term, phrase, symbol, abbreviation, or slang, in one or more languages, associated, directly or indirectly, with the business or agent thereof;

any term, phrase, symbol, abbreviation, or slang, in one or more languages, associated, directly or indirectly, with any products, product brand names, product brand lines, product features, and/or product stores associated with the business or agent thereof; and any term, phrase, symbol, abbreviation, or slang, in one or more languages, associated, directly or indirectly, with any services, service brand names, service brand lines, service features, and/or service stores associated with the business or agent thereof.

3. The method for automated insertion of relevant hyperlinks into social media-based communications of claim 1, wherein;

the one or more trigger terms associated with one or more of a business, product, and service are defined by a business owner and/or a provider of a product and/or a provider of a service.

4. The method for automated insertion of relevant hyperlinks into social media-based communications of claim 1, wherein;

the choice of which hyperlink, and associated webpage, to associate with a trigger term is made, at least in part, by a business owner.

5. The method for automated insertion of relevant hyperlinks into social media-based communications of claim 1, wherein;

the choice of which hyperlink, and associated webpage, to associate with a trigger term is made, at least in part, based on a location of a user sending and/or posting the original business relevant social media communication that includes the detected trigger term.

6. The method for automated insertion of relevant hyperlinks into social media-based communications of claim 1, wherein;

the choice of which hyperlink, and associated webpage, to associate with a trigger term is made, at least in part, based on a location included in text in the original business relevant social media communication that includes the detected trigger term.

7. The method for automated insertion of relevant hyperlinks into social media-based communications of claim 1, wherein;

the choice of which hyperlink, and associated webpage, to associate with a trigger term is made, at least in part, based on the language of text in the original business relevant social media communication that includes the detected trigger term.

8. The method for automated insertion of relevant hyperlinks into social media-based communications of claim 1, wherein;

the social media system is selected from the group of social media systems consisting of:

Facebook™;
MySpace™;
Linkedin™; and
Twitter™.

9. A system for automated insertion of relevant hyperlinks into social media-based communications comprising:

a social media system; and at least one processor associated with at least one computing system, the at least one processor executing instructions associated with a process for automated insertion of relevant hyperlinks into social media-based communications, the process for automated insertion of relevant hyperlinks into social media-based communications comprising:

obtaining data defining one or more trigger terms associated with one or more of a business, product, and service;

associating one or more hyperlinks to one or more webpages with each of the defined trigger terms;

monitoring social media communications associated with a social media system to detect a defined trigger term;

detecting a defined trigger term in an original social media communication message associated with the social media system, and determining a location of an intended receiver of the original social media communication message, the detected defined trigger term being a defined trigger term contained within an original social media communication message originated by a sender and intended to be received by the intended receiver, the sender and intended receiver being parties of the original social media communication message;

assigning one or more hyperlinks to the trigger term based on the determined receiver location;

inserting the one or more hyperlinks of one or more webpages associated with the detected trigger term into the original social media communication message, resulting in a modified social media communication message; and sending the modified social media communication message to the intended receiver through the social media system.

10. The system for automated insertion of relevant hyperlinks into social media-based communications of claim 9, wherein;

at least one of the one or more trigger terms associated with one or more of a business, product, and service is selected from the group of trigger terms consisting of:

any term, phrase, symbol, abbreviation, or slang, in one or more languages, associated, directly or indirectly, with the business or agent thereof;

any term, phrase, symbol, abbreviation, or slang, in one or more languages, associated, directly or indirectly, with any products, product brand names, product brand lines, product features, and/or product stores associated with the business or agent thereof; and any term, phrase, symbol, abbreviation, or slang, in one or more languages, associated, directly or indirectly, with any services, service brand names, service brand lines, service features, and/or service stores associated with the business or agent thereof.

11. The system for automated insertion of relevant hyperlinks into social media-based communications of claim 9, wherein;
   the one or more trigger terms associated with one or more of a business, product, and service are defined by a business owner and/or a provider of a product and/or a provider of a service.

12. The system for automated insertion of relevant hyperlinks into social media-based communications of claim 9, wherein;
   the choice of which hyperlink, and associated webpage, to associate with a trigger term is made, at least in part, by a business owner.

13. The system for automated insertion of relevant hyperlinks into social media-based communications of claim 9, wherein;
   the choice of which hyperlink, and associated webpage, to associate with a trigger term is made, at least in part, based on a location of a user sending and/or posting the original business relevant social media communication that includes the detected trigger term.

14. The system for automated insertion of relevant hyperlinks into social media-based communications of claim 9, wherein;
   the choice of which hyperlink, and associated webpage, to associate with a trigger term is made, at least in part, based on a location included in text in the original business relevant social media communication that includes the detected trigger term.

15. The system for automated insertion of relevant hyperlinks into social media-based communications of claim 9, wherein;
   the choice of which hyperlink, and associated webpage, to associate with a trigger term is made, at least in part, based on the language of text in the original business relevant social media communication that includes the detected trigger term.

16. The system for automated insertion of relevant hyperlinks into social media-based communications of claim 9, wherein;
   the social media system is selected from the group of social media systems consisting of:
   Facebook™;
   MySpace™;
   Linkedin™; and
   Twitter™.

* * * * *

UNITED STATES PATENT AND TRADEMARK OFFICE
CERTIFICATE OF CORRECTION

PATENT NO. : 8,661,327 B1  
APPLICATION NO. : 12/985641  
DATED : February 25, 2014  
INVENTOR(S) : Girish Mallenahally Channakeshava Page 1 of 1

It is certified that error appears in the above-identified patent and that said Letters Patent is hereby corrected as shown below:

In the Claims

In Column 27, Line 11, Claim 1, between "resulting in" and "social media", insert --a modified--.

Signed and Sealed this  
Fifteenth Day of July, 2014

Michelle K. Lee  
*Deputy Director of the United States Patent and Trademark Office*